United States Patent [19]

Uneback et al.

[11] Patent Number: 5,582,637
[45] Date of Patent: Dec. 10, 1996

[54] METHOD FOR IMPROVING THE RHEOLOGY AND THE PROCESSABILITY OF CELLULOSE-BASED SPINNING SOLUTIONS

[75] Inventors: Ingmar Uneback, Svenshögen; Margreth Strandberg, Stenungsund; Carl-Axel Söderlund, Karlstad, all of Sweden

[73] Assignee: Akzo Nobel Surface Chemistry AB, Stenungsund, Sweden

[21] Appl. No.: 530,128

[22] PCT Filed: Apr. 14, 1995

[86] PCT No.: PCT/SE94/00328
§ 371 Date: Oct. 12, 1995
§ 102(e) Date: Oct. 12, 1995

[87] PCT Pub. No.: WO94/25646
PCT Pub. Date: Nov. 10, 1994

[30] Foreign Application Priority Data

Apr. 23, 1993 [SE] Sweden ................ 9301363

[51] Int. Cl.$^6$ ................ C08L 1/22; C08L 1/24; C08L 1/02
[52] U.S. Cl. ................ 106/166.41; 106/166.43; 106/167.01
[58] Field of Search ................ 106/165, 167

[56] References Cited

U.S. PATENT DOCUMENTS 3,232,779  1/1966  Schönfeldt et al. ................ 106/165
4,418,026  11/1983  Merrick et al. ................ 264/8
5,047,197  9/1991  Uneback et al. ................ 264/193

FOREIGN PATENT DOCUMENTS 580008  7/1959  Canada ................ 106/165

OTHER PUBLICATIONS

*International Search Report.* PCT/SE94/00328, Dated Aug. 1, 1994.

*Primary Examiner*—David Brunsman
*Attorney, Agent, or Firm*—Ralph J. Mancini; Louis A. Morris

[57] ABSTRACT

The invention relates to the addition of an alkoxylate having the formula (I) $X(NX-R)_nNX_2$ and/or an alkoxylate having formula (II) wherein X is hydrogen, the group $R_1CO-$, in which $R_1$ is a hydrocarbon group having 7–23 carbon atoms or the group $-(B)_mH$, in which B is an alkyleneoxy group having 2–4 carbon atoms and m is 1–7, provided the number of groups of formula $R_{1CO}$ is 1 or 2 and the total number of B is 2–20, R is an alkylen group having 2–3 carbon atoms and n is 2–10, preferably 3–7, to improve the rheology and the processability of a cellulose-based spinning solution.

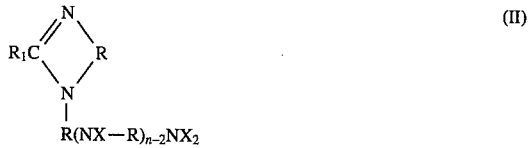

(II)

13 Claims, No Drawings

METHOD FOR IMPROVING THE RHEOLOGY AND THE PROCESSABILITY OF CELLULOSE-BASED SPINNING SOLUTIONS

This application is a 371 of PCT/SE94/00328 filed 14 Apr. 1994.

The present invention relates to a method for improving the processability and the rheological properties of cellulose-based spinning solutions by adding an alkoxylated amine compound. The cellulose content of the spinning solution and/or the flow rate thereof through piping, pumps, filters and spinning nozzles can thus be increased, resulting in improved processability, economy and product properties.

It is known that the rheology of cellulose-based spinning solutions exhibits different phases of state at varying shear forces. In Götze Chemiefasern, p. 499, there is thus given an example in which a cellulose-based spinning solution exhibits high structural viscosity in rest, while the apparent viscosity changes at varying shear forces. During the passage through a spinning nozzle, the viscosity is reduced by up to about 1/50 of the viscosity in rest. The apparent viscosity can also be increased by increasing the content of cellulose in the spinning solution. The viscosity increase entails many drawbacks. For example, it has been found difficult to use cellulose xanthate solutions having a cellulose content above 10% by weight, if regenerated cellulose fibres having high strength and extension are to be obtained. Other ways of increasing the apparent viscosity is to increase the average polymerisation degree of the cellulose solutions, to change the ratio of cellulose content to liquor content or to lower the temperature of the cellulose solution.

U.S. Pat. Specification No. 4,418,026 proposes adding as solvent to a cellulose acetate a composition containing polyethylene glycol having a molecular weight of 100,000–1,000,000. The purpose is to dispense with the different purification stages which are generally required after the acetate has been formed by acetylation, when using conventional cellulose acetate solvents.

From Swedish Patent Specification 8405800-7 it is known to improve the processability of cellulose-based spinning solutions by adding an ethylene oxide adduct having a molecular weight of 1.1–4.5 million, whereby the flow rate of the cellulose-based spinning solution through the spinning nozzle can be considerably increased. Even if high-molecular-weight ethylene oxide adducts have a good effect and significantly reduce the apparent viscosity of cellulose-based spinning solutions, their use has been hampered by the fact that they are difficult to produce and, hence, involve high costs. There is thus a need for other additives that can replace the high-molecular-weight polyethylene oxide adducts and also contribute to improved reactivity, reduced gel particle formation and improved filterability.

According to the present invention, it has now been found possible to obtain the desired rheological changes in cellulose-based spinning solutions and, for example, at a constant pressure drop over a spinning nozzle having conventional conical holes, to increase the flow rate of the cellulose-based spinning solution by adding an alkoxylate having the formula $$X(NX\text{-}R)_n NX_2 \qquad (I)$$

and/or

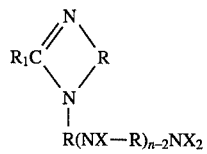

wherein X is hydrogen, the group $R_1CO\text{-}$, in which $R_1$ is a hydrocarbon group having 7–23 carbon atoms or the group $\text{-}(B)_m H$, in which B is an alkyleneoxy group having 2–4 carbon atoms and m is 1–7, provided the number of groups of formula $R_1CO$ is 1 or 2 and the total number of B is 2–20, R is an alkylene group having 2–3 carbon atoms and n is 2–10, preferably 3–7. Preferably, $R_1$ is a straight or branched, saturated or unsaturated aliphatic group having 9–21 carbon atoms. Of the total number of alkyleneoxy groups, 50–100% are suitably ethyleneoxy groups while the remaining alkyleneoxy groups preferably are propyleneoxy groups or a mixture of propyleneoxy groups and butyleneoxy groups. The total number of alkyleneoxy groups usually is 3–15, preferably consisting entirely of ethyleneoxy groups. The alkoxylate according to formulae I and II may in principle be added at any time during the production of the cellulose-based spinning solution. For example, the alkoxylate can be sprayed on to the native cellulose and/or be added to the mercerising liquor, to the solvent and/or to the finished spinning solution.

If desired, it is possible, in addition to the alkoxylate of formula (I), to add also other alkoxylates and/or solubilising agents. One example of such an additive is a compound having the formula $$X^1(NX^1\text{-}R)_n N(X^1)_2 \qquad (III)$$

wherein R and n are as defined above and $X^1$ is hydrogen or the group $(B)_m H$, where B and m are as defined above, the total number of B being 2–20. Compounds of formula (III) can suitably be added in an amount of 0–70% by weight of compounds of formula (I). Other examples of supplementary additives are fatty amine ethoxylate, polyethylene glycols having a molecular weight of 400–10,000, phenol and aliphatic alcohols as well as their alkoxylates, and ethoxylated glycerol.

The alkoxylate according to formula (I) or (II) also has a favourable effect on the filterability of the cellulose-based spinning solution in that the number of gel particles in the solution is reduced, so that less interference is caused during its flow through the spinning nozzle. The adducts also have a modifying effect by reducing the regeneration speed of the cellulose-based spinning solution when emerging from the spinning nozzle into the pricipitating bath. This results in improved thread strength and thread extension, at the same time as the improved regeneration of the cellulose-based spinning solution enables increased cellulose content and/or increased spinning speed.

One way of obtaining compound (I) or (II) is to react a carboxylic acid having the formula $$R_1COOH \qquad (IV)$$

wherein $R_1$ is as defined above, with a polyalkyleneamine having the formula $$H(NH\text{-}R)_n NH_2 \qquad (V)$$

wherein R and n are as defined above, in a molar ratio of 0.5–2, preferably 0.9–1.3 of carboxylic acid to polyalkyleneamine, whereupon the reaction product is alkoxylated with 2–20 moles per mole of polyalkyleneamine of formula (V). After the reaction between the carboxylic acid and the polyalkyleneamine and subsequent alkoxylation, there is obtained an alkoxylate of formulae (I) and/or (II). In the aqueous environment prevailing in conventional cellulose-based spinning solutions, the alkoxylate of formula (II) is however hydrolysed and forms an alkoxylate of formula (I). If carboxylic acid is used in excess, a condensate is obtained having more than one hydrocarbon group per polyethyleneamine, whereas if there is a deficiency of carboxylic acid or it is present in equimolar amounts, a certain amount of unreacted polyalkyleneamine will remain in the reaction mixture, which in the subsequent alkoxylation forms compounds of formula (III). The alkoxylate of formulae (I) and (II) can be added within wide limits, but the amount usually is above 0.1 kg/tonne of cellulose, preferably above 1 kg/tonne of cellulose. For economic and technical reasons, the added amount suitably is below 40, preferably 20 kg/tonne of pulp.

Thanks to the invention, it is possible to change the rheology of the spinning solution to optimise the flow conditions in the process. For example, the cellulose content of the spinning solution can be raised, the cellulose-to-liqour ratio of the spinning solution can be optimised, and the average polymerisation degree of the cellulose in the spinning solution can be increased, thus increasing the degree of orientation of the fibres which are formed in the spinning nozzle. Such fibrers exhibit higher strength and a more uniform thickness. An alternative to increasing the content of cellulose is to increase the flow velocity of the spinning solution in the nozzle.

The invention is especially useful for cellulose xanthate and copper/ammonium cellulose, but it can also be used for other cellulose-based spinning solutions, such as cellulose carbamate, cellulose dissolved in a tertiary amine oxide or in cold sodium hydroxide.

The invention will be further illustrated by the following Examples.

EXAMPLE 1

An ethoxylate of a fatty-acid polyamine adduct obtained by reacting 1.1 mole of fatty acid and 1 mole of polyethyleneamine, followed by ethoxylation with 5 moles of ethyleneoxide, was added to a spinning solution of cellulose dissolved in copper ammonium. The copper ammonium cellulose had been produced from a mixture of 8.5% $NH_3$ and 4% Cu in the form of $Cu(OH)_2$, based on the weight of the cellulose, in water of 22° C. The resulting spinning solution contained 10.0% copper ammonium cellulose calculated as pure cellulose and 2% $Na_2SO_4$ calculated as pure cellulose. After filtering, the rheological properties of the copper ammonium compound were examined. Measurements were conducted in a viscometer of the make Brookfield.

TABLE 1

| Added amount of fatty acid polyamine ethoxylate kg/t | Viscosity cP | Viscosity reduction % |
| --- | --- | --- |
| 0 | 16,000 | — |
| 1.0 | 8,100 | 49 |
| 2.4 | 8,000 | 50 |
| 4.0 | 7,900 | 51 |

These results show that an addition of 1–4 kg of the ethoxylate per tonne of copper ammonium cellulose gives a viscosity reduction in the order of 50%.

EXAMPLE 2

The same spinning solution and the same ethoxylate as in Example 1 were used, but the ethoxylate was added in other amounts. Spinning solutions with and without additions according to the invention were tested for flow rate through a spinning nozzle having 80 conical 200 µm-diameter holes at varying pressure drops. The following results were obtained.

TABLE 2

| | Spinning flow rate (mg/sec) and increase (%) | | | | |
| --- | --- | --- | --- | --- | --- |
| Pressure kg/cm$^2$ | Without additive | With additive 0.3 kg/tonne | Increase % | With additive 1.5 kg/tonne | Increase % |
| 1 | 82 | 97 | +18 | 155 | +89 |
| 2 | 240 | 363 | +51 | 770 | +221 |
| 3 | 468 | 570 | +22 | 1462 | +212 |

From these results appears that the spinning flow rate increases significantly by the addition of the ethoxylate.

EXAMPLE 3

A peroxide-bleached sulphite cellulose having an α-cellulose content of 92% by weight was mercerised in liquor containing 18.2% by weight of NaOH at 45° C. The alkali cellulose was xanthated with 30.5% by weight of $Cs_2$ based on the weight of the cellulose. The finished spinning solution contained 10.1% by weight of cellulose xanthate and 5.4% by weight of NaOH. The falling-ball time was 55 sec.

To this cellulose solution was added 0, 5, 15 or 30 kg/tonne of the ethoxylate in Example 1, and the flow rate of the different spinning solutions passing through a spinning nozzle having 150 holes of a diameter of 60 µm at a pressure of 2, 3 and 4 kg/cm$^2$ out into an aqueous solution containing 17% by weight of NaOH was measured. The following results were obtained.

TABLE 3

| | PRESSURE | | | | | |
| --- | --- | --- | --- | --- | --- | --- |
| | 2 kg/cm$^2$ | | 3 kg/cm$^2$ | | 4 kg/cm$^2$ | |
| Additive kg/tonne | Flow rate g/min | Increase % | Flow rate g/min | Increase % | Flow rate g/min | Increase % |
| 0 | 11.2 | — | 20.7 | — | 31.6 | — |
| 5 | 13.0 | 16.0 | 24.1 | 16.4 | 35.9 | 13.6 |
| 15 | 13.3 | 18.8 | 24.5 | 18.4 | 36.3 | 12.6 |
| 30 | 12.5 | 11.6 | 23.3 | 12.6 | 35.2 | 11.4 |

From these results appears that the flow rate through the spinning nozzle increases significantly by the addition of the ethoxylate.

EXAMPLE 4

The same spinning solution as in Example 3 was admixed with 5 kg of the ethoxylate in Example 3. The cellulose solution was pumped through a spinning nozzle having 250 holes of a diameter of 60 µm into a regeneration bath. This bath was composed of 150 g $H_2SO_4$, 10 g $ZnSO_4$ and 300 g $Na_2SO_4$ per liter of spinning bath and had a temperature of 50° C. The partly regenerated fibre was stretched in a stretching bath at 90° C., washed and dried. Spinning speed was 47.5 m/min.

The strength and the extension of the fibres were determined in dry state in a Textechno Fafegraph according to BISFA standards, and the tensile energy absorption was determined as the product of strength and extension. The wet modulus of the fibres was also determined in the same apparatus. For comparison, the same tests were performed on fibres obtained from the same spinning solution, but without the addition of the ethoxylate according to Example 3. The following results were obtained.

TABLE 4

| Fibre properties | Addition kg/tonne | |
|---|---|---|
| | 0 | 5 |
| Fibre coarseness Dtex g/1000 m | 2.01 | 2.05 |
| % increase | — | +2.0 |
| Tensile energy absorption (strength × extension) | 39.7 | 44.1 |
| Increase % | — | +11.1 |
| Wet modulus, cN/dtex per 5% extension | 0.151 | 0.183 |
| Increase % | — | 20.8 |

From these results appears that the addition of ethoxylate gives an improvement of the physical properties of the fibres.

EXAMPLE 5

A cellulose solution was prepared from chlorine-bleached spruce sulphite pulp in the same way as in Example 3. The spinning solution contained 10.2% by weight of cellulose xanthate and 5.8% by weight of NaOH and had a falling-ball time of 60 sec. Cellulose solutions with the addition of 0.5 and 15 kg of the ethoxylate in Example 1 were tested for spinning flow rate under the same conditions as in Example 3. The following results were obtained.

TABLE 5

| | Spinning flow rate (g/min) and increase (%) | | | | |
|---|---|---|---|---|---|
| | Addition | | | Addition | |
| Pressure kg/cm² | 0 kg/ tonne | 5 kg/ tonne | Increase % | 15 kg/ tonne | Increase % |
| 2 | 8.2 | 8.5 | +3.7 | 8.8 | +7.3 |
| 3 | 14.9 | 15.9 | +6.7 | 17.1 | +14.8 |
| 4 | 21.7 | 22.8 | +5.1 | 25.4 | +17.1 |
| 5 | 28.7 | 30.2 | +5.2 | 35.4 | +23.3 |

From these results appears that the addition of ethoxylate increases the flow rate through the spinning nozzle.

EXAMPLE 6

The cellulose solution of Example 5 was subjected to a spinning test in respect of fibre size and tensile energy absorption under the same conditions as in Example 4, but with the exception that the spinning speed was 87 m/min. The following results were obtained.

TABLE 6

| Addition | Fibre coarseness | | Tensile energy absoprtion | |
|---|---|---|---|---|
| kg/tonne | Dtex | Increase % | Strength × extension | Increase % |
| 0 | 2.15 | | 37.0 | |
| 5 | 2.74 | +28.1 | 40.1 | +8.4 |

From these results appears that both the fibre coarseness, i.e. the flow rate through the spinning nozzle, and the tensile energy absorption increase in the presence of the ethoxylate in the spinning solution.

We claim:

1. A method for improving the rheology and the processability of a cellulose-based spinning solution, which comprises adding to said solution, an alkoxylate having the formula

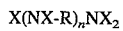

$$X(NX-R)_nNX_2 \quad (I);$$

and/or an alkoxylate having the formula

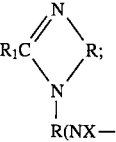

(II)

wherein X is hydrogen, the group $R_1CO$-, in which $R_1$ is a hydrocarbon group having 7–23 carbon atoms or the group $-(B)_mH$, in which B is an alkyleneoxy group having 2–4 carbon atoms and m is 1–7, provided the number of groups of formula $R_1CO$ is 1 or 2 and the total number of B is 2–20, R is an alkylene group having 2–3 carbon atoms and n is 2–10.

2. The method of claim 1 wherein the number of alkyleneoxy groups is 3–15.

3. The method of claim 1 characterised wherein the alkyleneoxy groups are ethyleneoxy groups.

4. The method of claim 1 wherein $R_1$ is a straight or branched, saturated or unsaturated aliphatic group.

5. The method of claim 1 wherein the spinning solution is a cellulose xanthate solution or a copper/ammonium cellulose solution.

6. The method in claim 1 wherein the alkoxylate of formulae (I) and/or (II) is added in an amount of 0.1–40 kg/tonne of cellulosa in the spinning solution.

7. The method of claim 6 wherein the alkoxylate of formula (I) and/or (II) is added in an amount of 1–20 kg/tonne of cellulose in the spinning solution.

8. The method of claim 1 wherein n is 3–7.

9. A cellulose-based spinning solution having improved rheology and processability which comprises an alkoxylate having the formula

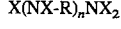

$$X(NX-R)_nNX_2 \quad (I)$$

and/or an alkoxylate having the formula

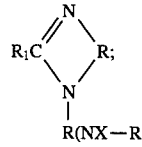

(II)

wherein X is hydrogen, the group $R_1CO$-, in which $R_1$ is a hydrocarbon group having 7–23 carbon atoms or the group -(B)$_m$H, in which B is an alkyleneoxy group having 2–4 carbon atoms and m is 1–7, provided the number of groups of formula R$_1$CO is 1 or 2 and the total number of B is 2–20, R is an alkylene group having 2–3 carbon atoms and n is 2–10.

10. The solution of claim 9, wherein the number of alkyleneoxy groups is 3–15.

11. The solution of claim 9 wherein the alkyleneoxy groups are ethyleneoxy groups.

12. The solution of claim 9 wherein R$_1$ is a straight or branched, saturated or unsaturated aliphatic group.

13. The solution of claim 9 wherein n is 3–7.

* * * * *